United States Patent [19]
Upton et al.

[11] Patent Number: 6,020,847
[45] Date of Patent: *Feb. 1, 2000

[54] GEOLOCATION METHOD AND APPARATUS FOR SATELLITE BASED TELECOMMUNICATIONS SYSTEM

[75] Inventors: Eric L. Upton, Redondo Beach; Scott A. Stephens, Manhattan Beach, both of Calif.

[73] Assignee: TWR Inc., Redondo Beach, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/638,066

[22] Filed: Apr. 25, 1996

[51] Int. Cl.$^7$ ........................................ G01S 5/02
[52] U.S. Cl. ............................ 342/357.16; 342/357.05; 342/458
[58] Field of Search .................................. 342/353, 357, 342/457, 458, 453, 387; 455/54.1, 54.2, 456

[56] References Cited

U.S. PATENT DOCUMENTS

| | | | |
|---|---|---|---|
| 2,845,621 | 7/1958 | Habrook | 342/387 |
| 4,161,730 | 7/1979 | Anderson | 342/52 |
| 4,252,999 | 2/1981 | Acampora et al. | 370/323 |
| 4,538,218 | 8/1985 | Rajan . | |
| 5,017,926 | 5/1991 | Ames et al. | 342/353 |
| 5,381,444 | 1/1995 | Tajima | 342/118 |
| 5,412,388 | 5/1995 | Attwood | 342/357 |
| 5,412,389 | 5/1995 | Olds | 342/357 |
| 5,444,450 | 8/1995 | Olds et al. | 342/357 |
| 5,500,648 | 3/1996 | Maine et al. | 342/357 |

FOREIGN PATENT DOCUMENTS 0601293  9/1993  European Pat. Off. .

OTHER PUBLICATIONS

"GPS Signal Structure and Performance Characteristics", J.J. Spilker, Jr., Global Positioning System, 1980.

"Introduction to Communications Engineering", Robert M. Gagliardi, A Wiley–Interscience Publication, 1988, pp. 538–553.

"Satellite Communications Systems", Second Edition, by G. Maral and M. Bousquet, published by John Wiley & Sons, 1995, Chapters 4 and 5.

*Primary Examiner*—Gregory C. Issing
*Attorney, Agent, or Firm*—Michael S. Yatsko

[57] ABSTRACT

A method for determining the geolocation of a user terminal within a telecommunications system having a constellation of satellites which relay communications signals between earth stations and user terminals over preassigned channels. The method performs synchronization upon the telecommunications signals to calculate timing and frequency update information for the user terminals. The timing and frequency update information is also used within the earth station to calculate the geoposition of the user terminal. To do so, the earth station calculates a distance between the satellite and a user terminal based on the corresponding propagation time therebetween which is obtained from the timing information. Once the satellite to user terminal distance is obtained, a range solution line may be calculated therefrom. In addition, the frequency update information is used to calculate a Doppler solution line upon which the user terminal is positioned. Thereafter, the range and Doppler solution lines are combined to obtain points of intersection therebetween. These points of intersection represent potential geolocations of the user terminal. The earth station discriminates between these intersection points in one of several manners, such as the coverage beam spot or geographic cell assigned to the user terminal. Upon obtaining a single intersection point, the longitude and latitude of this point or output is the geolocation of the user terminal.

5 Claims, 4 Drawing Sheets

GEOLOCATION METHOD AND APPARATUS FOR SATELLITE BASED TELECOMMUNICATIONS SYSTEM

FIELD OF THE INVENTION

The present invention generally relates to a satellite based telecommunications system. More specifically, the invention relates to a method and apparatus for calculating the geolocation of user terminals based on information within the communications signal.

BACKGROUND OF THE INVENTION

Today, satellite systems exist for supporting telecommunications with, and/or providing geolocation information to, user units. Satellite based telecommunications systems, such as Odyssey (as proposed by the assignee of the present application), utilize a constellation of satellites to relay communications signals between user terminals and earth or base stations. The user terminals are assigned to earth stations. The earth stations direct calls to and from the assigned user terminals. The user terminals and associated earth stations communicate along preassigned communications channels having a preassigned bandwidth (subband) centered about a carrier frequency.

Satellite based navigation systems, such as the global positioning satellite (GPS) system, include a constellation of satellites which transmit navigation signals to the user units. Each satellite emits a unique navigation signal along a preassigned navigation channel. User units obtain navigation information from multiple navigation signals and, based thereon, calculate the terminal's position relative to the earth. One GPS technique is explained in an article entitled "GPS Signal Structure and Performance Characteristics", by J. J. Spilker, Jr., Global Positioning System, which is incorporated by reference in its entirety.

The navigation and communications signals are transmitted over separate, mutually exclusive channels specifically designated to carry corresponding signals. Consequently earth stations, satellites and user terminals must be designed to support separate communications and navigation channels, thereby undesirably complicating the overall system. Existing telecommunications systems have not been able to merge communications and geolocation signals/data onto a single RF signal.

As the popularity of cellular telecommunications increases, more and more demands are being placed upon the capacity of telecommunications satellite systems. These demands effectively monopolize the available communications subbands. Satellite systems have attempted to increase the overall capacity of the available frequency subbands by utilizing a variety of user-access or "spread spectrum-based" techniques to increase the user-density within a given frequency subband. These user-access techniques include frequency division multiple access (FDMA coding), time division multiple access (TDMA coding), and code division multiple access (CDMA coding). In addition, hybrid techniques have been proposed using a combination of TDMA, FDMA and CDMA codes. Depending upon the coding technique, each user terminal when assigned to a corresponding channel, is given a unique TDMA/FDMA/CDMA code and/or transmission timing/frequency. The user terminals transmit and receive all communications signals at the assigned carrier channel, code and transmission timing/frequency.

As the coding techniques increase the user density, acceptable tolerances decrease between adjacent user channels before co-channel interference results. Therefore, the above-mentioned coding techniques require the communications link between a user terminal and an earth station to be adjusted or tuned continually. Such adjustments are necessary to ensure that the user terminal continues to transmit within its assigned channel as the user terminal and/or coverage satellites move relative to one another.

User terminals and earth stations transmit telecommunications signals as discrete packets or frames of information. Several of the above-mentioned coding techniques require that the communications link be maintained "synchronous" between the earth station and the user terminal. A "synchronous" communications link requires that each frame of data be received (at a user terminal or an earth station) at an instant in time simultaneous with receipt of frames transmitted from other terminals and/or earth stations. The frames must also be received in the assigned subband centered about an assigned carrier frequency. Thus, synchronization and subband alignment are determined with respect to the receiver.

However, synchronization and subband alignment are continuously effected 1) by variations in range between the satellites and user terminals or earth stations (e.g., propagation delay) and 2) by changes in the relative range velocity between the satellite and the user terminals or earth stations (e.g., Doppler effect).

Propagation delay variation arises as user units and/or coverage satellites move since the distance or range changes between a user terminal and its associated earth station. Consequently, the propagation time of a frame between an earth station and user terminal changes. To compensate for variations in the propagation time, the transmitter (e.g., earth station or user terminal) retards or advances the initiating time at which data frames are transmitted. Thus, transmitters located near an intended receiver retard the transmission initiating time, while transmitters located far from the receiver advance the transmission initiating time.

Doppler shift variation arises as satellites move relative to earth stations and user terminals since the resultant carrier frequency perceived at a receiver changes. For instance, when a satellite moves toward a user unit, the perceived carrier frequency at the satellite (and at the subsequent earth station) of a communications signal is greater than the actual carrier frequency at which the user terminal transmitted the communications signal. Stated another way, the perceived carrier frequency at the receiver is greater than it would otherwise be if the satellite and transmitter remained at rest with respect to one another. Similarly, when the satellite moves away from the transmitter, the receiver perceives a carrier frequency which is lower than the carrier frequency which would be otherwise perceived if the satellite were not moving relative to the transmitter. This phenomena is referred to as the "Doppler effect". Transmitters (e.g., user terminals and earth stations) adjust the carrier frequency, at which communications signals are transmitted, to account for positive and negative Doppler shifts. By adjusting the frequency and timing, a transmitter ensures that communications signals transmitted therefrom remain within the assigned channel and arrive synchronous with signals from other transmitters.

The timing and frequency may be controlled in several manners. For instance, the earth station may transmit timing and frequency update information to each user terminal.

However, conventional telecommunication systems limit the use of the telecommunications channels to transmission of telecommunications information. Consequently, in conventional telecommunications systems separate channels must be used to provide other functions such as navigation and the like.

Moreover, systems which provide GPS-type navigation information require an unduly large number of satellites. To calculate geolocation, GPS user terminals require simultaneous line-of-sight navigation links with multiple satellites. Consequently, the GPS system necessitates a constellation of satellites which ensure that multiple satellites are simultaneously viewable at each position covered by the system. This multi-satellite coverage technique unduly increases the number of satellites.

A need remains within the industry for an improved geolocation method and apparatus for use with satellite based telecommunications. It is an object of the present invention to meet this need.

SUMMARY OF THE INVENTION

It is an object of the present invention to provide geolocation information and telecommunications data over a single channel.

It is an object of the present invention to provide a satellite based telecommunications system which calculates the geographic position of a user terminal based on related information passed along the communications link.

It is a corollary object of the present invention to utilize common signal parameters to maintain synchronization of the communications return link and to calculate a range solution line to the user terminal.

It is a further corollary object of the present invention to utilize the frequency offset parameter to retain proper channel alignment and to calculate the doppler solution line to the user terminal.

It is a further object of the present invention to combine the range and doppler solutions obtained during synchronization and channel alignment to calculate geoposition.

It is yet another object of the present invention to afford network control, such as call routing, based on geolocation information obtained from RF communications signals.

It is a further object of the present invention to afford emergency location services based on geolocation information obtained from RF communications signals.

It is another object of the present invention to provide navigational and communications services to the user terminals over a single channel.

It is yet another object of the present invention to use a communications channel for the dual purpose of calculating billing and call management information between location areas and companies which require different types of services based on their location.

These and other objects are achieved by a method for determining the geolocation of a user terminal within a telecommunications system having a constellation of satellites which relay communications signals between earth stations and user terminals over preassigned channels. The method performs synchronization upon the telecommunications signals to calculate timing and frequency update information for the user terminals. The timing and frequency update information is also used within the earth station to calculate the geoposition of the user terminal. To do so, the earth station calculates a distance between the satellite and a user terminal based on the corresponding propagation time therebetween which is obtained from the timing information. Once the satellite to user terminal distance is obtained, a range solution line may be calculated therefrom. In addition, the frequency update information is used to calculate a Doppler solution line upon which the user terminal is positioned. Thereafter, the range and Doppler solution lines are combined to obtain points of intersection therebetween. These points of intersection represent potential geolocations of the user terminal. The earth station discriminates between these intersection points in one of several manners, such as the coverage beam spot or geographic cell assigned to the user terminal. Upon obtaining a single intersection point, the longitude and latitude of this point or output is the geolocation of the user terminal.

DETAILED DESCRIPTION OF THE PREFERRED EMBODIMENT

Figure 1:
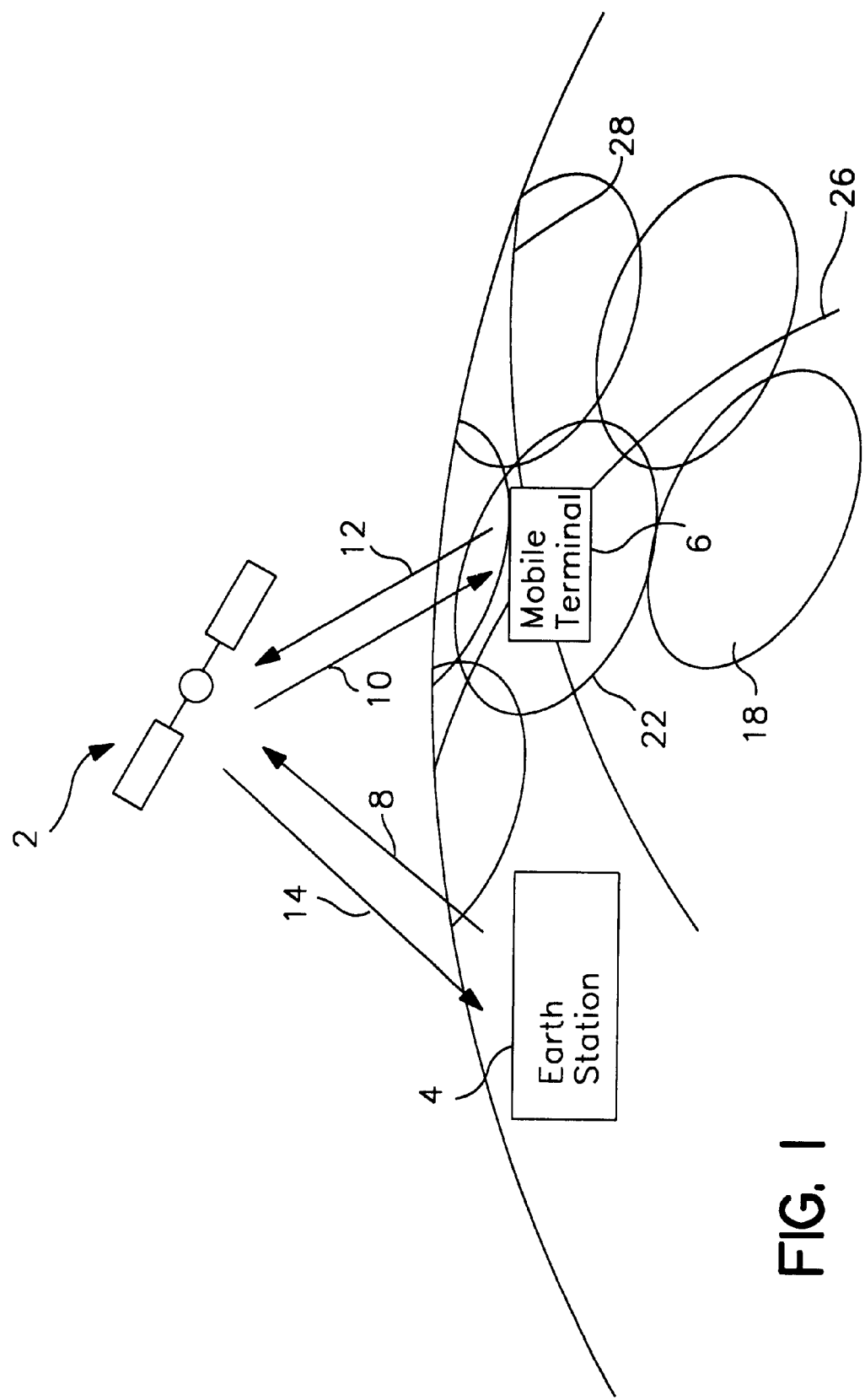
FIG. 1 generally illustrates a perspective view of a satellite system according to the present invention.

FIG. 1 generally illustrates a satellite based telecommunications system including a satellite 2 which relays communications signals between an earth station 4 and a user terminal 6. The earth station 4 transmits signals to the user terminal 6 through a forward link including link sections 8 and 10. The user terminal 6 transmits communications signals to the earth station 4 via a return link including link sections 12 and 14. The satellite 2 functions as a "bent pipe" and passes communications received upon forward link section 8 onward to the user terminal 6 via link section 10. Similarly, the satellite 2 relays without delay signals received upon link section 12 to the earth station 4 upon return link section 14. The preferred embodiment may utilize a closed loop system in which the earth station 4 transmits corrective timing and frequency error information to each corresponding user terminal to maintain a synchronous communications line between. While FIG. 1 illustrates a single user terminal 6, it is understood that the preferred embodiment is useful with multiple terminals, earth stations and satellites.

Figure 2:
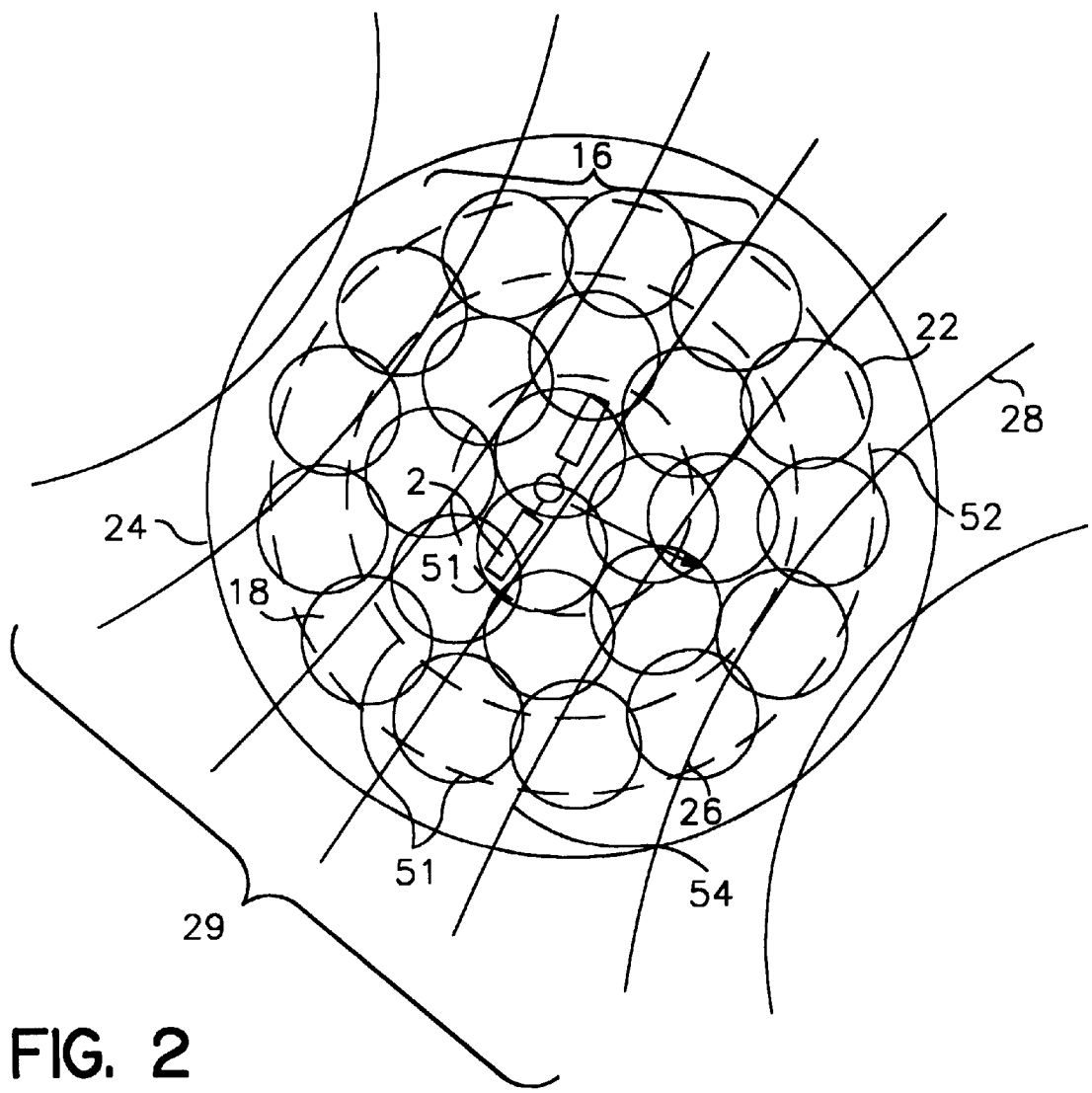
FIG. 2 generally illustrates a top plan view of a satellite and its associated coverage footprint.

FIG. 2 illustrates a footprint 16 representing the coverage area of satellite 2. The satellite 2 forms the footprint 16 from a plurality of overlapping beam coverage spots 18. The footprint 16 moves across the surface of the earth 24 as the satellite 2 travels in the direction indicated by arrow 20. The satellite 2 may support communications between the earth station 4 and user terminal 6 as long as they are located in the footprint 16.

The satellite based telecommunications system of the preferred embodiment may utilize several management techniques such as spread spectrum communications. By way of example only, the system may use code division multiple access (CDMA) coding. Other coding techniques may be used so long as they enable multiple user stations 6 to transmit continuously and upon mutually exclusive channels. Such channels may be in the same frequency band, such as one of the frequency subbands assigned to beam spot 22. As more user terminals transmit within the same frequency subband, the potential for interference increases.

Interference is avoided at the earth station by identifying a unique "signature" for each user terminal and its associated communications signal. Each user terminal is assigned a unique signature (e.g., a unique CDMA code, TDMA code, FDMA code) for transmission within the corresponding frequency subband. By way of example only, when CDMA coding is used, each signature represents a unique preassigned waveform or chip sequence, wherein a chip may represent a portion of a binary bit depending upon the number of user terminals assigned to the subband. The user terminal combines its signature waveform with outgoing frames or packets of communications and/or command data. The resultant combined RF signal is transmitted at the preassigned carrier frequency. When CDMA coding is used, the combination of the assigned carrier frequency and the terminal's unique CDMA code define a "channel" assigned to the particular user terminal.

Optionally, a variety of PN or CDMA codes may be used. Other codes may be used so long as the code retains a highly orthogonal characteristic. In other words, it is desirable that the code be easily distinguishable 1) from a replica of itself shifted in time and 2) from other codes used within the same subband of the telecommunications system.

Further explanation of multiple access coding techniques, such as TDMA, FDMA and CDMA may be found in the book entitled "*Satellite Communications Systems, Second Edition*" by G. Maral and M. Bousquet, published by John Wiley and Sons, Ltd., West Sussex, England, 1993, Chapters 4 and 5. Chapters 4 and 5 of the above-referenced book to Maral, et al. are incorporated herein by reference in their entirety. CDMA coding is also explained in detail in a book entitled "*Introduction to Communications Engineering*", second edition, by Robert M. Gagliardi, published by Wiley-Interscience Publications, N.Y., N.Y., at pages 538–553. The pages 538–553 of the book to Gagliardi are also incorporated by reference.

Figure 3:
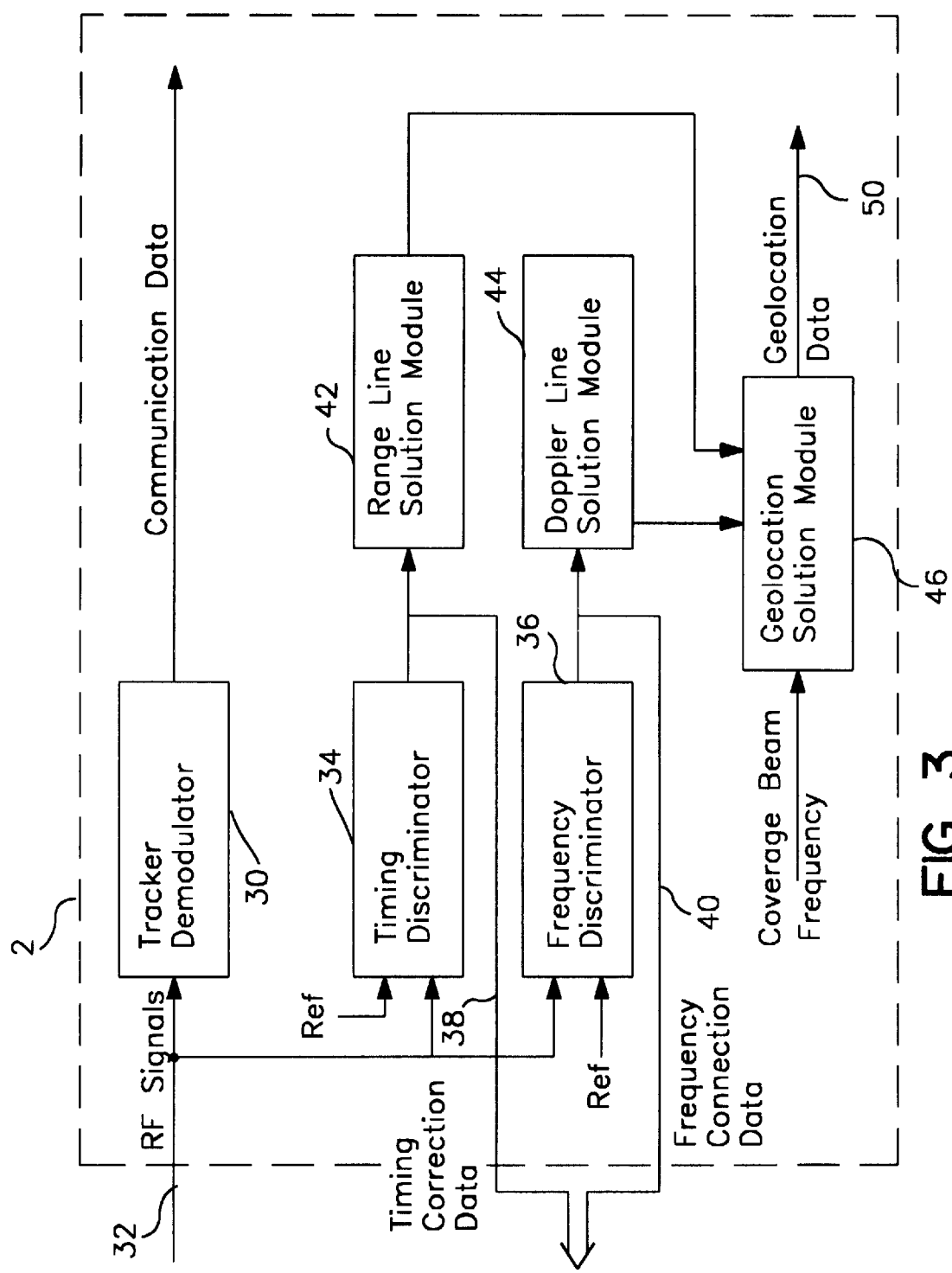
FIG. 3 generally illustrates a block diagram of an earth station according to the preferred embodiment of the present invention.

FIG. 3 illustrates, in block diagram form, a configuration for the earth station 4 utilized when calculating geolocation information. The earth station 4 includes a tracker demodulator 30 which receives an RF signal on line 32. The tracker demodulator 30 processes the received RF signal based on stored reference signatures for user terminals assigned to the earth station. The tracker demodulator 30 outputs communications data. When CDMA coding is used, the demodulator 30 may receive multiple incoming RF signals superimposed upon one another and substantially synchronized in time with respect to a reference time. Such synchronization ensures that the signature for each user terminal's RF signal is aligned in time with one another. In addition, all incoming RF signals must be centered about the corresponding carrier frequency to minimize co-channel interference.

While it is understood that the earth station processes multiple RF signals from multiple user terminals, for purpose of simplification, a single RF signal from a signal user terminal is explained below in connection with the geolocation process.

The earth station 4 includes timing and frequency discriminators 34 and 36 which receive an RF signal. The timing discriminator 34 compares the incoming RF signal with a timing reference signal. The frequency discriminator 36 compares the incoming RF signal with a frequency reference signal. Based on these comparisons, the timing and frequency discriminators 34 and 36 output timing and frequency error correction data, respectively, along lines 38 and 40. The timing and frequency correction data are transmitted to the associated user terminal. The timing correction data may instruct the user terminal to advance or retard the initiating time of each frame of communications data in order to synchronize the starting point of such frames with incoming frames of data from other user terminals in the same subband and/or beam coverage spot.

As to frequency correction, the discriminator 36 directs, via the frequency correction data, the user terminal to increase or decrease the transmission carrier frequency in order to ensure that the perceived carrier frequency at the earth station corresponds to the user terminal's assigned carrier frequency. The perceived frequency at the earth station does not necessarily equal the transmitted frequency at the user terminal. Instead, as noted above, relative motion between the user terminal and satellite induce "Doppler" shifts into the carrier frequency. The amount of Doppler shift is dependent upon the distance between the user terminal and satellite. Also, the direction of the Doppler shift, namely positive or negative, is dependent upon the direction of travel of the satellite relative to the user terminal.

By way of example, as a satellite moves toward a user terminal, the perceived carrier frequency at the earth station receiver is greater than the emitted carrier frequency at the user terminal transmitter. Divergently, as the satellite moves away from the user terminal, the perceived carrier frequency at the earth station receiver is lower than the carrier frequency emitted at the transmitter. The frequency correction data transmitted to the user terminal enables the user terminal to adjust its transmitter carrier frequency to ensure that the received carrier frequency corresponds to the assigned carrier frequency for the channel to which the user terminal has been assigned to maintain its communications link with the earth station.

FIG. 2 illustrates a plurality of Doppler solution lines (generally denoted by bracket 29). Each Doppler solution line is associated with a specific Doppler shift value. Consequently, a user terminal located anywhere along a single one of Doppler solution lines 29 will experience the same Doppler shift. Thus, an earth station receiver will perceive the same shift in carrier frequency from a user terminal located anywhere along a single Doppler solution line.

FIG. 2 also illustrates a plurality of range solution lines (generally denoted by dashed lines 51). Each range solution line is associated with a constant distance between the satellite and user terminal. Each range solution line corresponds to a unique round trip propagation time delay between the earth station, satellite and user terminal. The round trip propagation time equals the time required for an RF signal to travel along forward link sections 8 and 10 to the user terminal and back along the return link sections 12 and 14 to the earth station.

Returning to FIG. 3, the timing and frequency correction data are also supplied to range and doppler line solution modules 42 and 44. The range and doppler line solution modules 42 and 44 calculate the range line 26 and doppler solution line 28 (FIG. 1).

The range solution module 42 calculates a range solution line 26 based on the earth station to user terminal range which is calculated based on the round trip propagation time required for a communications signal to travel along the forward links 8 and 10 (FIG. 1) and return along the return links 12 and 14. Once the round trip propagation time is calculated by the discriminator 34, the range between the satellite and user terminal may be calculated since the range between the satellite and earth station is already known. Once the range between the satellite and user terminal is calculated, a range solution line 26 may be drawn (as shown in FIG. 1) with the satellite 2 at its center and with a radius equalling the distance between the satellite and user terminal. The Doppler solution line module 44 may calculate the Doppler shift line 28 based on the frequency shift between the transmitted carrier frequency at the user terminal and the received carrier frequency at the earth station. Optionally, the transmitted carrier frequency may be calculated from stored past Doppler shift information concerning the user terminal which is updated repeatedly with the frequency error data determined in discriminator 34. Once the frequency shift is calculated, a corresponding Doppler solution line may be obtained, such as from a look-up table or through empirical techniques.

Once the range solution line and Doppler solution line are calculated in modules 42 and 44, these line solutions are passed to the geolocation module 46. The module 46 thereafter calculates the intersections of these lines as longitudes and latitudes. For instance, the solution line may represent an equation defining a circle, centered at the satellite, on which the user terminal must fall. Similarly, the Doppler solution line may represent an equation defining an arc centered on the axis of the satellites direction of movement. The lines include two points of intersection at points 52 and 54. The correct point of intersection may be determined based upon the carrier frequency of the beam spot covering the user terminal. As explained above, each beam spot utilizes one or more unique subband carrier frequencies. Consequently, the beam spot surrounding point 52 utilizes a carrier frequency which differs from the beam spots surrounding point 54. Based thereon, point 54 may be discarded and point 52 identified as the geolocation of the user terminal.

Figure 4:
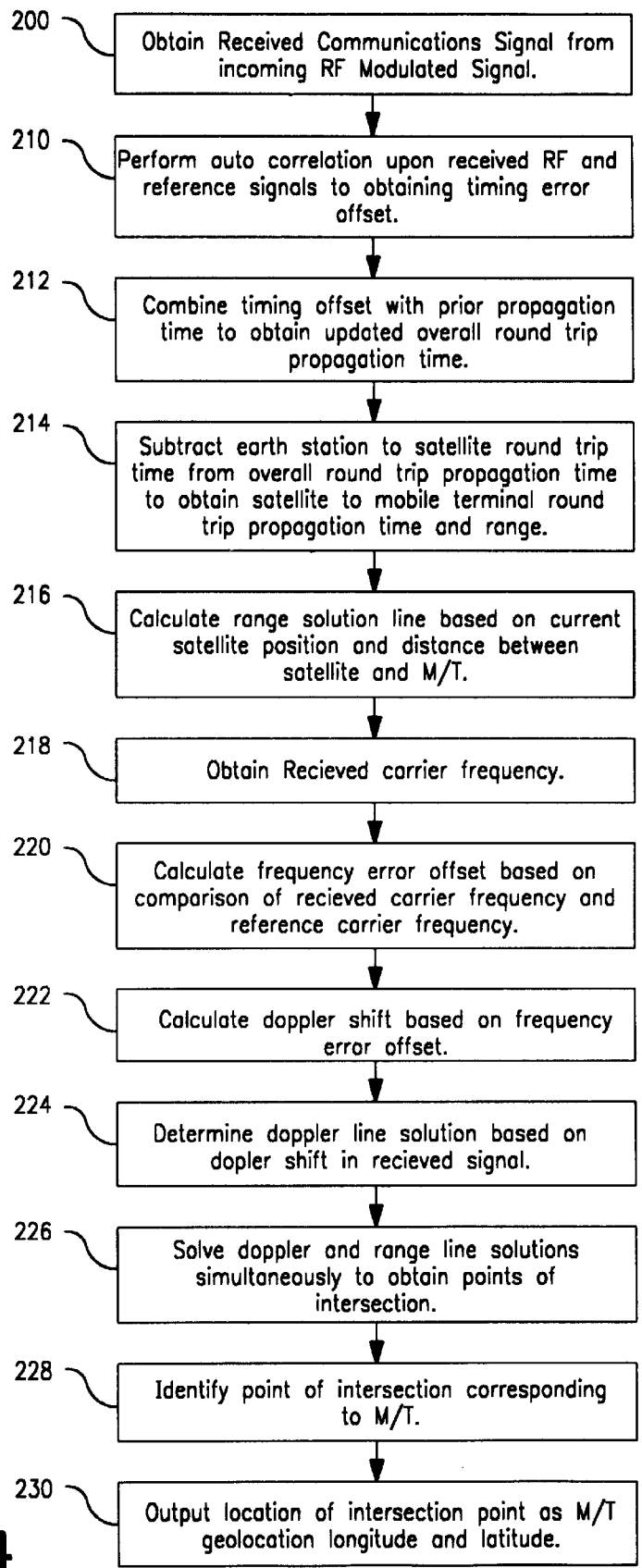
FIG. 4 generally illustrates a flow chart of the processing sequence followed by an earth station according to a preferred embodiment of the present invention.

FIG. 4 illustrates the processing sequence carried out by the preferred embodiment of the present invention to calculate the user terminal's geolocation. Once a communications signal is received (step 200), auto correlation is performed (step 210). The received RF signal may include a synchronization field which contains a synchronization signal that is correlated with a reference sync signal (e.g., reference signature code) to calculate the timing shift within the received RF signal from its desired start time. A timing error offset is obtained from this correlation process (step 210). At step 212, the timing offset is combined with the prior known propagation time between the earth station and user terminal to obtain an updated overall round trip propagation time. Next, at step 214, the propagation time between the earth station and satellite is subtracted from the updated overall round trip propagation time in order to obtain the propagation time between the satellite and user terminal. Once the satellite to user terminal round trip time is obtained, the distance or range therebetween may similarly be obtained. At step 216, a range solution line (such as line 26 in FIGS. 1 and 2) is calculated based on the satellite's current position and the distance between the satellite and user terminal. As noted above, the current satellite position and the satellite to user terminal distance serve as a center and radius, respectively, of a range solution line.

At step 218 the carrier frequency of the received communications signal is obtained. At step 220, a frequency error offset is calculated based on a comparison of the received carrier frequency and a reference carrier frequency. As explained above, the received and reference carrier frequencies will vary as the distance and relative velocity between the satellite and user terminal change. Turning to step 222, a Doppler shift is next obtained based on the frequency offset calculated in step 220. Thereafter, a Doppler solution line (such as line 28 in FIGS. 1 and 2) is obtained based on the Doppler shift in the received signal. When calculating the Doppler solution line, the earth station also considers the satellite's current position, direction of movement (as indicated by arrow 20 in FIG. 2) and velocity relative to the user terminal.

At step 226, the Doppler and range solution lines are simultaneously solved to obtain points of intersection (such as points 52 and 54 in FIG. 2). The points of intersection represent potential geolocations of the user terminal. At step 228, the earth station identifies the point of intersection (between points 52 and 54) corresponding to the user terminal. This identification may be carried out in a variety of manners. For instance, when points 52 and 54 lie within different coverage beam spots, the earth station may distinguish therebetween by determining which point of intersection lies within the coverage beam spot covering the user terminal.

Alternatively, the earth station may identify the point of intersection corresponding to the user terminal based on the user terminal's current assigned geographic cell. Geographic cells represent fixed predefined regions upon the earth which differ from coverage beam spots. Optionally, each user terminal may be assigned to a particular geographic cell. In such case, the earth station would distinguish between intersection points 52 and 54 based upon the geographic cell assigned to the user terminal. As a further option, discrimination between points 52 and 54 may be effected by a process of elimination. Once the desired point of intersection is identified, it is output as the user terminal's geolocation at step 230. This geolocation output may include a longitude and latitude identifying the user terminal's location.

The above identified geolocation information may be used for a variety of purposes. For instance, the geolocation may provide network control information necessary for call routing. The geolocation information may also be used to provide emergency location services, such as during 911 calls, to identify the position of the user terminal. Further, the geolocation information may be used to provide navigation services, billing and call management and the like, such as between countries and companies providing and requiring different services as a function of the user terminal's location, including service restrictions.

Optionally, the code timing discriminator 34 may be modified to utilize a variety of conventional synchronization routines for analyzing the incoming signal. The discriminator 34 may utilize auto correlation through any of several known techniques, such as the Tau-Dither method, Early-Late method, the Dot Product method and the like.

Alternatively, the preferred embodiment may be modified to utilize a communications link based on FDMA or TDMA coding or a hybrid coding technique, such as the combination of FDMA, TDMA, and CDMA codes. The code may utilize one or more of these coding techniques, so long as each communications signal received at the earth station includes a unique signature, such as an orthogonal code.

In the preferred embodiment, the synchronization data may be obtained by comparing reference signals with sync signals stored in a sync field of each frame of the RF signal. Optionally, the sync signal may be superimposed upon the data in the data field.

While particular elements, embodiments and applications of the present invention have been shown and described, it will be understood, of course, that the invention is not limited thereto since modifications may be made by those skilled in the art, particularly in light of the foregoing teachings. It is, therefore, contemplated by the appended claims to cover such modifications as incorporate those features which come within the spirit and scope of the invention.

We claim:

1. A method for determining a geolocation of a user terminal in a satellite based telecommunications system which passes communications signals along assigned channels between a user terminal, a satellite, and an associated earth station, said method comprising the steps of:

receiving a telecommunications signal over an assigned channel from a user terminal at an earth station;

determining a timing error offset representative of motion of said user terminal relative to said earth station and based on said telecommunications signal;

combining said timing error offset with a round trip propagation delay representing round trip propagation time of an RF signal through said user terminal, a satellite, and said earth station to obtain an updated round trip propagation delay through said user terminal, said satellite, and said earth station;

removing an earth station-to-satellite round trip delay from said updated round trip propagation delay, thereby determining a satellite-to-mobile terminal round trip propagation delay;

determining a range solution line based on said satellite-to-mobile terminal round trip propagation delay;

determining a Doppler solution line based on said telecommunications signal;

determining geographic points of intersection of said range and Doppler solution lines; and outputting one of said geographic points of intersection as a geolocation of the user terminal.

2. The method of claim 1, wherein said step of outputting a geolocation comprises determining a geolocation for said user terminal based on said range solution line, said Doppler solution line, and a beam spot covering said user terminal.

3. The method of claim 1, wherein said step of outputting a geolocation comprises determining a geolocation for said user terminal based on said range solution line, said Doppler solution line, and a predefined geographic cell to which said user terminal is assigned.

4. The method of claim 1, wherein said step of determining a timing error offset comprises correlating said second telecommunications signal with a reference sync signal.

5. A method for determining a geolocation of a user terminal in a satellite based telecommunications system which passes communications signals along assigned channels between a user terminal, a satellite, and an associated earth station, said method comprising the steps of:

transmitting a first telecommunications signal over an assigned channel to a user terminal;

receiving a second telecommunications signal over an assigned channel from said user terminal at an earth station;

determining a round trip propagation delay through said user terminal, a satellite, and said earth station based on said first and second telecommunications signals;

receiving a subsequent telecommunications signal over the assigned channel from said user terminal at said earth station;

determining a timing error offset representative of motion of said user terminal relative to said earth station and based on said subsequent telecommunications signal;

combining said timing error offset with said round trip propagation delay to obtain an updated round trip propagation delay;

removing an earth station-to-satellite round trip delay from said updated round trip propagation delay, thereby determining a satellite-to-mobile terminal round trip propagation delay;

determining a range solution line based on said satellite-to-mobile terminal round trip propagation delay;

determining a Doppler solution line based on said subsequent telecommunications signal; and determining geographic points of intersection of said range and Doppler solution lines; and outputting one of said geographic points of intersection as a geolocation of the user terminal.

* * * * *